Inventors:
Hartwig Beyersdorf
Gerhard Bering
By: Spencer & Kaye
Attorneys

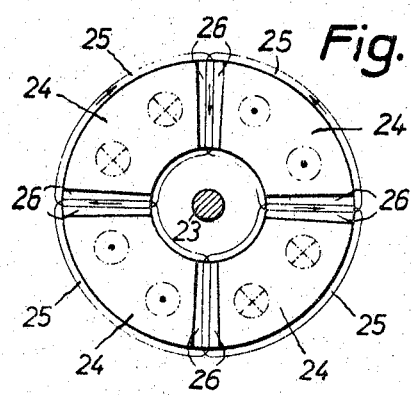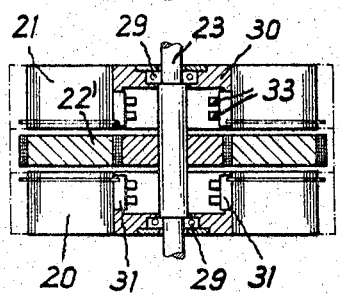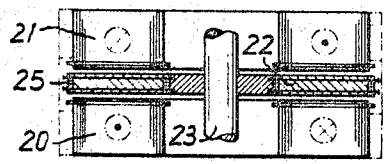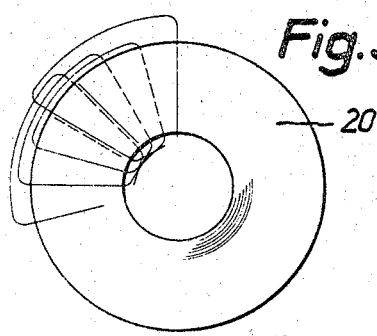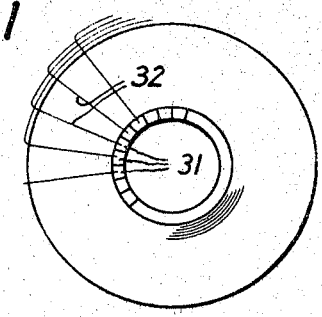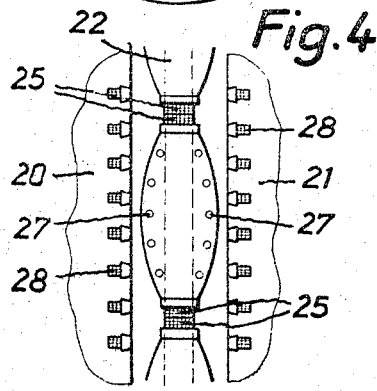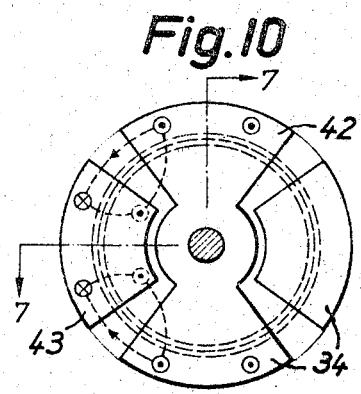

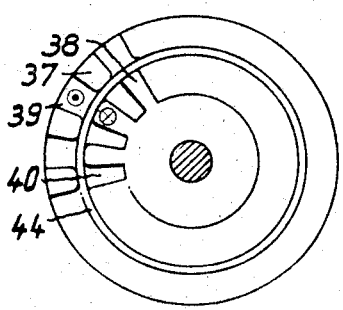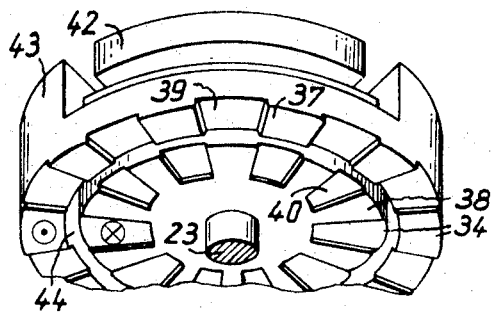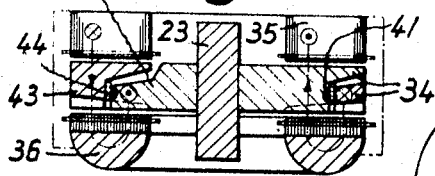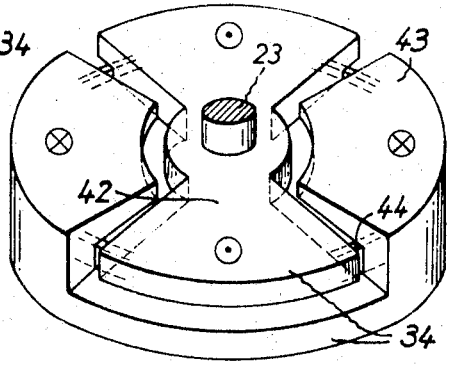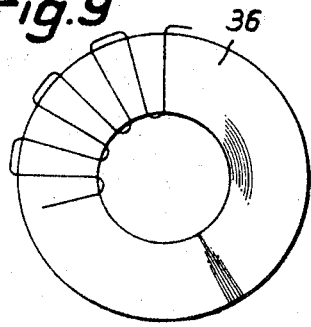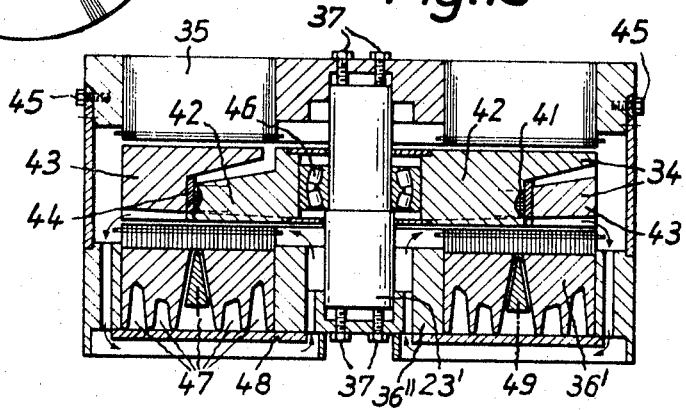

Inventors:
Hartwig Beyersdorf
Gerhard Bering
By: Spencer & Kaye
Attorneys

United States Patent Office 3,435,267
Patented Mar. 25, 1969

3,435,267
DISCOIDAL ELECTRICAL MACHINES
Hartwig Beyersdorf, Bremen-Arbergen, and Gerhard
Bering, Bremen, Germany, assignors to Lloyd
Dynamowerke G.m.b.H., Bremen, Germany
Filed Jan. 21, 1966, Ser. No. 522,231
Claims priority, application Germany, Jan. 21, 1965,
L 49,770; July 31, 1965, L 51,277
Int. Cl. H02k 17/42
U.S. Cl. 310—168               32 Claims

ABSTRACT OF THE DISCLOSURE

A rotary electrical machine composed of at least one stator disc and at least one rotor disc, there being a total of three discs, the discs being separated from one another and spaced axially from each other to define two axially extending air gaps at least one of which has a varying reluctance around the circumference of the machine, the machine further including an A.C. winding whose radial conductors are disposed in radial grooves formed in the surface of one of the discs which faces the one air gap, the machine further including an annular D.C. excitation winding carried by the other disc which is adjacent the one air gap, one of the discs adjacent the air gap being composed of an inner disc portion and a concentric outer ring portion and the D.C. excitation winding being axially aligned with the boundary between the two portions so that the flux produced by the excitation winding traverses the inner portion in one axial direction and the outer portion in the opposite axial direction.

---

The present invention relates to the field of electrical machines, and more particularly to rotary machines having a stator and a rotor.

Presently existing rotating machines, such as motors, generators and converters, are almost invariably constructed in cylindrical form, i.e., with one component being disposed concentrically around the other component and being radially separated therefrom by a concentric annular air gap. This form of construction places an inherent limitation on the percentage of the stator and rotor bodies, which are generally made of iron or steel, through which magnetic flux can be made to flow during operation. This is due primarily to the fact that the cross section of the axially extending teeth on the rotor and/or stator and the maximum tooth induction determined thereby restricts a greater utilization of the remainder of the stator and the rotor bodies, and to the fact that the magnetic return paths through these bodies are relatively long.

On the other hand, a class of electromagnetic devices, as exemplified by electromagnetic slip clutches, is known wherein the two mutually rotatable members are constructed in the form of discs which are axially spaced from one another.

It has been found that this latter form of construction can be advantageously applied to the construction of electrical machines of the type previously described so as to produce a more effective utilization of the bodies from which the two members are formed. However, a truly efficient utilization of devices constructed in this form has been heretofore hampered because of the problems created by the occurrence of attractive forces between the stator and the rotor during operation. This is particularly true of machines designed to operate at high power levels. It has also been found that separate devices for compensating these forces are extremely expensive. In addition, development of these devices has been held back by serious winding problems.

It is therefore a primary object of the present invention to eliminate these drawbacks.

It is another object of the present invention to produce a rotary electrical machine in the form of a motor, a generator, or a converter which has disc-shaped portions and which operates more efficiently than previously known devices of this type.

The basic objects of the present invention are achieved by the provision of a rotary electrical machine having first means defining a stator having a disc-shaped construction and second means defining a rotor having a disc-shaped construction, wherein one of these means is constituted by two structurally separate discs axially spaced from one another and the other one of these means is disposed between them and is spaced axially from each of the discs to define two air gaps each of which extends between the other means and a respective one of the discs.

Applicants have found that this form of construction can be applied equally well to the production of D.C. machines, synchronous machines, or asynchronous machines. Other features of the present invention, which will be described in detail below, have proven to be particularly advantageous when used in the construction of D.C. machines and synchronous machines having a D.C. excitation winding carried by that one of the means which is disposed between the two structurally separate discs. Devices according to the present invention can be arranged so that either one or both of the means rotate.

Applicants have also found that devices constructed according to the present invention have the particular advantage that, when supplied with a given level of D.C. excitation, they produce an output which is of the order of two times as large as that produced by previously known devices, whether they are utilized as motors or generators. In order to appreciate more fully the advance represented by the present invention, it should be noted that the above-mentioned two-fold increase in efficiency is taken in comparison with devices having a disc-shaped construction and a separate magnetic return path or a magnetic shunt path. The novel construction of the present invention also permits a substantial increase in efficiency with respect to other forms of construction.

Additional objects and advantages of the present invention will become apparent upon consideration of the following description when taken in conjunction with the accompanying drawings in which:

FIGURE 1 is a axial, cross-sectional view of a first embodiment of the present invention.

FIGURE 2 is a plan view of one member of the device of FIGURE 1.

FIGURE 3 is a plan view of another member of the device of FIGURE 1.

FIGURE 4 is a developed axial view of the device of FIGURE 1.

FIGURE 5 is an axial, cross-sectional view of another embodiment of the present invention.

FIGURE 6 is a plan view of one member of the device of FIGURE 5.

FIGURE 7 is an axial, cross-sectional view of a further embodiment of the present invention taken along the plane defined by the line 7—7 of FIGURE 10.

FIGURE 8 is a plan view of one member of the device of FIGURE 7.

FIGURE 9 is a plan view of another member of the device of FIGURE 7.

FIGURE 10 is a plan view of the other surface of the member shown in FIGURE 8.

FIGURE 11 is a bottom perspective view of the members shown in FIGURES 8 and 10.

FIGURE 12 is a top perspective view of the members shown in FIGURES 8 and 10.

FIGURE 13 is an axial, cross-sectional view of still another embodiment of the present invention.

Figure 14:
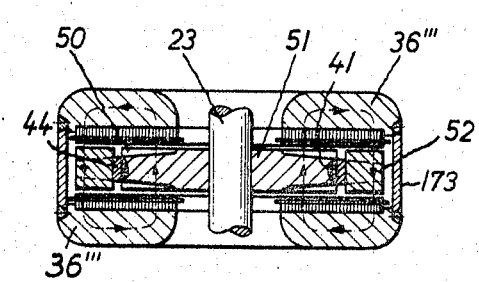
FIGURE 14 is an axial, cross-sectional view of a still further embodiment of the present invention.

A first embodiment of the present invention is shown in FIGURES 1 to 4 in the form of an electrical machine having a stator which is subdivided into two discs 20 and 21 which are axially spaced from one another, and a disc-shaped rotor 22 which is positioned between stator discs 20 and 21 and which is mounted on a shaft 23 for rotation therewith. FIGURE 2 shows the manner in which the rotor 22 is provided with an excitation winding. The surface of rotor 22 is divided into four equal quadrants 24 each bounded by one coil 25 of the excitation winding. When current is caused to flow through these coils in the directions indicated by the arrows, the resulting heteropolar excitation produces a magnetic flux which follows the paths indicated in a conventional manner in FIGURES 1 and 2. These coils are supplied with current in a conventional manner. The current source may be an electric battery, or a rectifier.

Each of the quadrants 24 thus constitutes one pole of the device, the sides of which poles extend in a radial direction. Between the radially extending conductors of the coils 25 and the radial edges of the poles, regions of low magnetic conductivity are provided for achieving a high degree of magnetic separation between the poles. In this embodiment, these regions of low magnetic conductivity are constituted by strips of nonmagnetic material 26. The two discs 20 and 21 are each provided with an A.C. winding, one form of which is shown in FIGURE 3. The conductors of this winding are disposed in suitable grooves or bores formed in discs 20 and 21 and are wound in a conventional manner. The discs 20 and 21 are preferably formed of a plurality of laminations by coiling a plated sheet metal strip in a spiral manner. The nonmagnetic material of the strips 26 may be a resinous coating, or brass, or nonmagnetic steel.

In order to cause the machine to operate, the winding defined by coils 25 is supplied with direct current, while the windings on discs 20 and 21 are supplied with alternating current if the device is to operate as a motor. On the other hand, if the device is to operate as a generator, coils 25 are supplied with direct current and shaft 23 is driven into rotation. The winding on discs 20 and 21 will then provide the generator output current.

Turning now to FIGURE 4, which is a developed axial view of the device of FIGURES 1 to 3, there is shown one form of construction for the rotor 22. It may be observed that the rotor has a nonuniform cross section which is designed to give the voltage induced in the A.C. windings a form which is as nearly sinusoidal as possible. Damper windings 27 are disposed in the thickened sections of rotor 22, while the excitation winding coils 25 are disposed at the points of minimum cross section. The A.C. windings on discs 20 and 21 are disposed in radial grooves 28 formed therein.

As a general rule, the central disc-shaped member of devices constructed according to the present invention, whether it acts as the rotor or the stator, carries the D.C. excitation winding. For devices which are to operate as synchronous machines or D.C. machines, the winding is formed to provide a heteropolar excitation and the central member of the machine need be of laminated construction only if the machine is designed for high power operation. On the other hand, the excitation winding will be replaced by a squirrel cage winding if the machine is to operate as an asynchronous device, in which case the central member of the machine must invariably be laminated.

The A.C. winding carried by each of the outer partial discs in radially-extending grooves or bores formed in those disc end faces which are directed toward the central member may be either in the form of single-phase or polyphase windings. Connections are made to the windings carried by the rotating machine member by means of slip rings, or commutators, and brushes, as is well-known in the art, or, in suitable cases, by means of a separate excitation machine which is disposed on the same shaft as the rotating member and which is also constructed according to the principles of the present invention, the conductors leading from the excitation machines to the winding extending, for example, through the common shaft.

The demper winding provided in the above-described embodiment, as well as in the embodiments to be described below, is preferably constituted by a plurality of radially extending damper rods which are arranged in the form of wheel spokes and which are short-circuited together by means of an outer ring and an inner ring.

The damper winding is preferably constituted by two groups of rods, each of which groups is positioned on a respective side of the median plane of the central member as close as possible to the corresponding end face of this member. A similar construction may be used for the squirrel cage winding when a machine according to the present invention is intended to operate as an asynchronous device and when the central disc-shaped member is to be provided with this squirrel cage winding.

Referring now to FIGURES 5 and 6, there is shown another embodiment of the present invention which is constructed in the form of a direct current machine. The central member 22' of this machine is identical with the member 22 of the embodiment of FIGURES 1 to 4, with the exception that member 22' has a uniform thickness and is not provided with damper windings. In this embodiment, the central member 22' is stationary, while the outer discs 20 and 21 are mounted for rotation on the shaft 23. The members 20 and 21 are constructed in laminated form in the manner described above for the embodiment of FIGURES 1 to 4. The disc portions 20 and 21 are mounted on the shaft 23 with the aid of bearings 29 and hollow hubs 30, and are provided with axially extending commutator segments 31 mounted thereon. The A.C. windings 32 are connected to these commutator segments, as is shown in FIGURE 6. Brushes 33 are positioned in contact with the commutator segments 31.

It may be appreciated that the location of the commutator and brush assembly according to the present invention, which arrangement may be used in devices other than that shown in FIGURES 5 and 6, substantially eliminates all of the mechanical problems which were created by the effects of centrifugal forces on these elements in prior art devices. This is due primarily to the fact that the commutators and brushes of devices constructed according to the present invention can be placed much closer to the machine shaft than was heretofore possible. As a result, the commutator segments of devices according to the present invention can be made considerably thinner than prior art commutator segments because these prior art segments were made relatively thick only in order to withstand the high centrifugal forces to which they were subjected.

The diameter of the rings defining the commutator may be made somewhat smaller than the inner diameter of the disc parts with which they are associated in order to permit the interposition of an electrical insulation therebetween and any connecting leads which may be required can be positioned adjacent the commutator.

It would also be possible to utilize a commutator or slip rings having an annular configuration and disposed adjacent one or both end faces of one or more of the disc-shaped members.

Embodiments similar to that of FIGURES 5 and 6 can also be provided with slip rings which are positioned adjacent the commutator and which are connected to the A.C. winding leads if it is desired to have the machine operate as a single armature converter for direct current and/or alternating current.

A device similar to that shown in FIGURES 5 and 6 can also be advantageously constructed so that the two outer discs 20 and 21 are stationary and the central member 22' is rotatable and has its excitation winding supplied through the intermediary of slip rings. In this case, a rectifier could be connected in series with the A.C. winding and switching means could be provided for by-passing this rectifier in case it is desired to operate the machine as a single armature converter, it then being possible to produce either a D.C. or an A.C. output. The slip rings for the central member 22' would be disposed near the rotating shaft in the vicinity of either one or both end faces of the central member, these slip rings being electrically insulated from the central member. When it is desired to operate the machine as a single armature converter, the central member 22' can be replaced by the member 22 of FIGURE 4.

Referring now to FIGURES 7 to 12, there is shown yet another embodiment of the present invention constituted by a machine which operates as a converter. In this embodiment, the central member 34 (FIGURE 7) cooperates with the disc portion 35 to constitute a synchronous motor and with the disc portion 36 to constitute an A.C. generator. If it is desired to have this motor-generator set operate at medium frequencies, the utilization of air gaps having a variable magnetic conductance is desirable. The disc 35 is constructed and provided with windings in a manner similar to that shown for the disc portion 21 of FIGURE 3. The disc portion 36 is provided with a winding having the form shown in FIGURE 9. The disc 36 is provided with a laminated portion having a predetermined thickness in the vicinity of the air gap and the remainder of the disc is constituted by a solid body which provides the magnetic return path for the flux passing therethrough.

The rotary central member 34 is constructed, as is shown in FIGURE 8, with two bands of radially extending slots and teeth, the inner band being constituted by slots 40 and teeth 38 and the outer band being constituted by slots 39 and teeth 37. The slots and teeth of the outer band are angularly offset with respect to those of the inner band in such a way that each slot 39 is disposed opposite a tooth 38 and each tooth 37 is disposed opposite a slot 40. The circular boundary between these two bands is arranged in axial alignment with the homopolar excitation winding 41 disposed in rotary member 34. The rotary member 34 is constructed of two pieces, an inner disc portion 42 and an outer ring portion 43, the two portions being magnetically isolated from each other by an interposed separating layer 44 made of a nonmagnetic material. The homopolar excitation winding 41 is disposed in a groove formed in the outer circumference of disc portion 42.

The other surface of central member 34 is constructed in the manner illustrated in FIGURE 10. As may be seen therein, the inner disc portion 42 is formed with two outwardly extending sectors which extend to the outer circumference of the member 34, whereas the ring-shaped portion 43 is provided with two extensions which project radially inwardly and which have their center lines oriented at right angles to the center lines of the projections on disc portion 42. Since the part of disc portion 42 in which flux is induced by winding 41 is disposed radially to the inside of winding 41, while the part of ring portion 43 in which flux is also induced by winding 41 is located radially outwardly from this winding, flux will flow generally vertically in one direction through the projections on portion 42 and vertically in the other direction through the projections on ring portion 43. Thus, these projections behave as claw poles and support flux flows which follow paths as indicated by conventional symbols in FIGURES 7, 8 and 10 to 12. According to the convention adopted for describing the operation of this embodiment, it may be seen that the flux flows generally upwardly, i.e., in a direction from disc 36 to disc 35, through disc portion 42 and downwardly through ring portion 43, the flux return paths being provided by discs 35 and 36.

In order to provide a better understanding of the construction of member 34, this member is shown in two perspective views in FIGURES 11 and 12. It may be readily appreciated that the generator portion of this embodiment, which is composed of members 34 and 36, operates according to the known principle of a modulation machine having homopolar excitation, while the motor portion, which is composed of members 34 and 35, operates as a synchronous motor having heteropolar excitation.

It should be particularly noted that the provision of the claw poles on member 34 enables this member to convert the homopolar excitation produced by winding 41 into a four-pole heteropolar excitation. It is this effective heteropolar excitation which produces a synchronous motor action between members 34 and 35. At the same time, the two bands of slots and teeth in the lower end face of member 34 create an air gap between this member and member 36 whose magnetic conductance varies cyclicly along each machine radius so as to induce an alternating voltage in the windings carried by disc 36.

Each portion of member 34 may be made from a solid piece of material having a high magnetic conductance, while the disc 36 is constituted of a solid piece of a similar material on which is disposed, on the side facing member 34, an annular portion which is formed by coiling a strip of plated steel in a spiral manner, this annular portion having radial grooves or bores formed therein for receiving the radial conductors of the winding shown in FIGURE 9. The strip is plated with a material having a low magnetic conductance so that each spiral turn of the strip is effectively magnetically isolated from its adjacent turns in order to cause each turn of the coiled strip to provide a separate magnetic flux path.

Turning now to FIGURE 13, there is shown a modification of the embodiment of FIGURES 8 to 12 showing one mounting arrangement and means for cooling and regulating the voltage of the generator portion of the machine. In the device illustrated, the shaft 23 is non-rotatably mounted and is provided with adjusting screws 37 which permit the vertical position of member 34 to be varied in order to permit an adjustment of the relation between the length of the air gap defined by members 34 and 36' and that of the air gap defined by members 34 and 35. In order to permit the sum of the length of both air gaps to be varied, there is also provided additional adjusting means 45. Central member 34 is supported for rotation with respect to shaft 23' by means of bearings 46, these bearings being so constructed that member 35 is restrained from movement in an axial direction with respect to shaft 23'.

Disc 36' is provided with an axially movable reinforcement ring 36" which is positioned to attract a portion of the excitation flux so that this portion will by-pass the region enclosed by the A.C. winding on disc 36. The axial position of this ring will determine the percentage of flux which does not act on the A.C. winding and hence the voltage induced in this winding.

Disc 36' is formed with a spiral recess 47 in its lower end face. The recess 47 is closed by a cover plate 48 and is filled with a cooling medium which cools air passing across cover plate 48. When member 34 rotates, the teeth 37 and 38 and the slots 39 and 40 provided thereon produce an air flow which follows paths indicated by the arrows in FIGURE 13, which passes through axial passages in disc 36' and which flows past plate 48. The cooled air then flows back through the air gap between member 34 and disc 36' in order to cool this region.

As may also be seen from FIGURE 13 the cross section of disc 36' which does not constitute a portion of the flux path is eliminated in order to markedly reduce the total weight of the machine.

According to another feature of the present invention, disc 36' is provided with an annular, wedge-shaped groove within which is disposed a ring 49 having a similar cross section. The position of this ring 49 may be varied in an axial direction in order to vary the magnetic resistance offered to flux by disc 36', and thus in order to control the voltage induced in the winding carried by disc 36'. It should also be noted that the adjustment of the axial position of ring 49 permits a control of the time constant of the generator portion of the machine.

Yet another embodiment of the present invention is shown in FIGURE 14 to include two similar discs 36, which are each substantially identical with the similarly-numbered disc shown in FIGURES 7 and 9, and a central member 50 which is mounted for rotation with shaft 23. Member 50 is constructed so as to be symmetrical with respect to its median plane, each side thereof being provided with two bands of teeth and slots which are identical with the teeth 37 and 38 and the slots 39 and 40 of the member shown in detail in FIGURES 8 and 11. The inner disc portion 51 of member 50 is magnetically isolated from the outer ring portion 52 thereof by a separating layer 44 made of a nonmagnetic material. A homopolar excitation is provided by the annular excitation winding 41 mounted in a groove formed in the outer circumference of inner disc portion 51. Excitation winding 41 produces magnetic flux which flows along paths indicated generally by dot-dash loops. This machine finds primary application as a generator and operates as a modulation device.

Figure 15:
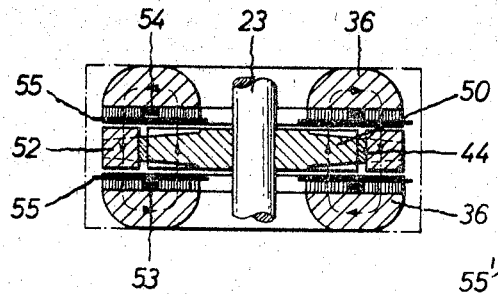
FIGURE 15 is an axial, cross-sectional view of yet a further embodiment of the present invention.
Figure 16:
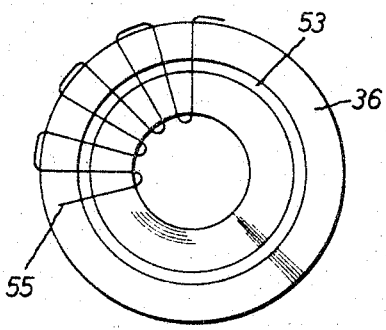
FIGURE 16 is a plan view of one member of the device of FIGURE 14.

A modification of the device of FIGURE 14 is shown in FIGURE 15 wherein the excitation winding is divided into two winding parts 53 and 54 each of which parts is carried in a respective one of the discs 36. FIGURE 16 shows the arrangement of one excitation winding part 53 in a disc 36. There is also shown the manner in which the A.C. winding 55, which will serve as the output winding when the device operates as a generator, is disposed around the end face of disc 36.

Figure 18:
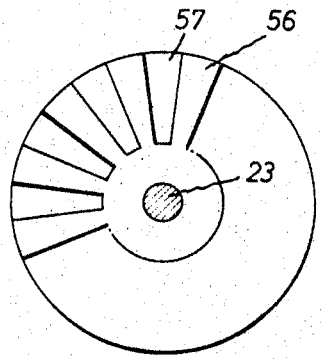
FIGURE 18 is a plan view of one member of the device of FIGURE 17.
Figure 17:
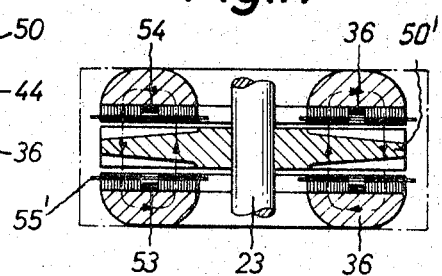
FIGURE 17 is an axial, cross-sectional view of yet another embodiment of the present invention.
Figure 19:
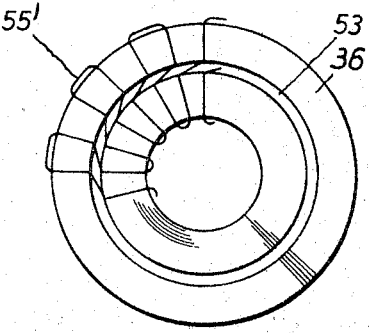
FIGURE 19 is a plan view of another member of the device of FIGURE 17.

Yet another modification of the generator is shown in FIGURES 17 to 19. According to this modification, the central member 50' is made of a single piece of material and is formed with only one band of slots 57 and teeth 56 on each side thereof. The arrangement of slots and teeth is best shown in FIGURE 18. When the central member 50' is constructed in the manner shown in FIGURE 18, it is necessary to arrange the A.C. output windings 55' in the manner shown in FIGURE 19, wherein each radially extending conductor thereof has a first portion disposed in one radial groove or bore in disc 36 and a second portion disposed in the next succeeding groove or bore therein, the transition between conductor portions taking place in the region where the conductor traverses the excitation winding 53. The radial grooves or bores are preferably formed in the laminated portion of disc 36 which is constituted by a coiled strip of plated steel, each of these bores being interrupted by the annular groove provided for excitation winding 53, the A.C. winding 55' being disposed above the winding 53, as is shown in FIGURE 17. The number of radial conductors of each A.C. winding is preferably made equal to the total number of slots and teeth in the corresponding end face of rotor 50'.

It may be appreciated that the passage of each conductor of winding 55' from one radial groove to the next-succeeding radial groove in the device of FIGURES 17 to 19, or the provision of two bands of slots and teeth in the devices of FIGURES 14 and 15 is necessary because the flux produced by winding 41 or the two winding parts 53 and 54 flows in one axial direction in the region enclosed by the excitation winding or windings and in the opposite axial direction in the region which is to the outside thereof. Therefore, if one of the above-mentioned arrangements were not used, the voltage induced in one half of each conductor of winding 55 or 55' would cancel out the voltage induced in the other half of the conductor.

It should be noted that any one of the devices shown in FIGURES 14 to 19 could readily be arranged to produce two different frequencies by causing the number of slots and teeth on one side of the central member, and the number of conductors of the corresponding A.C. winding, to be different from that on the other side of this member. It should also be noted that the arrangements previously described, particularly in connection with FIGURE 13, for controlling the induced voltage, the generator time constant, and the air gap dimensions can be applied to the structures shown in FIGURES 14 to 19.

In the case where the excitation winding is divided into two parts, as is shown in FIGURES 15 to 17, the two winding parts are preferably connected in series in order to insure that the magnetic excitation field will always be symmetrical with respect to the median plane of central member 50 or 50'.

The embodiments of the present invention which have thus far been described in detail represent basic devices which operate in a more efficient manner than the prior art arrangements. These devices are characterized by the provision of excitation fields across air gaps having the largest cross-sectional area possible and by the arrangement of A.C. windings which are subjected to the action of substantially the entire resulting excitation field. The embodiments of the present invention which will be described below constitute noteworthy refinements of these basic devices which yield additional substantial advantages. As will be described in greater detail below, these advantages are created primarily by a more efficient utilization of the material constituting the machine parts and by substantial simplifications in the manufacture of their components.

The embodiments shown in FIGURES 20 to 43 represent generators which operate either according to the modulation principle or according to the oscillating field principle. FIGURES 20 to 26 illustrate embodiments which are constructed as heterpoloraly excited generators, this form of excitation permitting a high degree of regulation to be achieved, through controlling the excitation current, because such generators have relatively short excitation time constants.

Figure 20:
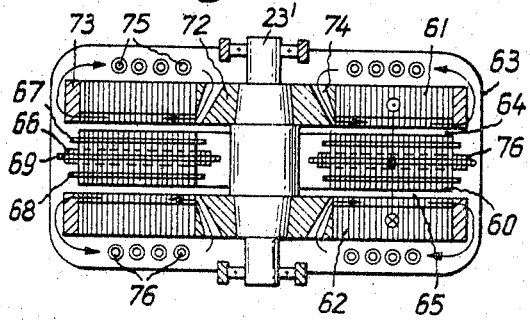
FIGURE 20 is an axial, cross-sectional view of yet a further embodiment of the present invention.

Referring first to FIGURE 20, there is shown a generator having a central stator member 60 surrounded by two discs 61 and 62 constituting the machine rotor. The stator 60 is mounted in the housing 63 by means of suitable cross pieces (not shown) and is radially displaced from the rotor shaft 23', while the rotor discs 61 and 62 are provided with conical seats through the intermediary of which they are mounted on correspondingly shaped portions of shaft 23'.

Stator 60 is a laminated piece which is constructed by coiling a sheet metal strip which has previously been suitably coated or plated with an insulating material so that the resulting stator is constituted by a series of turns between which are disposed a series of axially extending, insulating, separating layers. This form of construction is also preferably utilized for the laminated or coiled portions of the devices shown in FIGURES 1 to 19. The laminated stator may be baked into a solid body by applying an adhesive between the turns of the coiled sheet metal and by applying a sufficient degree of heat to the resulting unit. In order to reduce the iron losses and to increase the flux density through air gaps 64 and 65, the stator 60 may be fabricated from a strip of grain-oriented steel. The stator is provided with a heteropolar excitation winding 66 and with two alternating voltage windings 67 and 68 each disposed near a respective one of the air gaps 64 and 65, which air gaps are defined by the regions between stator 60 and rotor discs 61 and 62, respectively.

Pipes 69 for conducting cooling fluid are disposed along the median plane of the stator 60 and extend in a radial direction, all of the pipes being preferably connected together to have the form of an elementary single-phase wave winding.

The annular portions of the rotor discs which are coextensive with the stator 60 are built up from laminations and may be constructed in the same manner as that described above for the stator 60. Since these portions of the stator discs are constituted by substantially circular laminations which are magnetically isolated from one another, the excitation flux produced by the heteropolar excitation winding 66 is caused to follow return paths having arcuate portions in planes perpendicular to the shaft axis, these portions being concentric with the axis of shaft 23'. This arrangement thus serves to produce a particularly effective magnetic field.

Both the stator 60 and the laminated portions of the rotor discs 61 and 62 may be made of a plurality of annular rings instead of a single-coiled strip.

It may be appreciated that the form of construction of the embodiment of FIGURE 20 is particularly advantageous because all of the windings are disposed on the stationary member. It will be readily appreciated that this arrangement permits connections to be made to the windings in the simplest manner. In addition, the provision of the excitation winding 66 at the median plane of the central stator member 60 assures that the attractive forces which both rotor discs exert on the stator, as a result of the magnetic field produced by winding 66, will completely cancel each other out.

Figure 23:
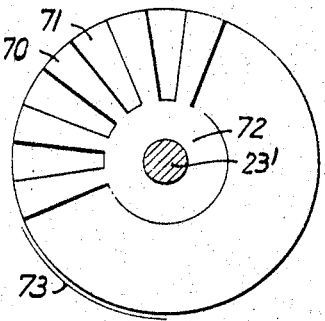
FIGURE 23 is a plan view of one member of the device of FIGURE 20.

The portions of the rotor discs 61 and 62 which are coextensive with the stator 60 are provided, on the end face facing the stator, with a series of alternating, radially extending teeth 70 and slots 71 as is shown in FIGURE 23. The teeth and slots serve to produce the cylically varying magnetic conductance in the air gaps 64 and 65. In addition, these teeth and slots produce an effective ventilating action which serves to cool the machine parts during rotation.

The laminated portion of each rotor disc is positioned between a hub 72 made from a solid piece and a ring 73 which has preferably been shrunk on and which is made of a nonmagnetic material. The hub 72 and ring 73 may also be joined together by a series of radially extending rods or spokes made of a non magnetic, electrically conductive material, which rods would preferably extend across that end face of the rotor which is directed toward the stator 60. These rods would then form, together with the ring 73 and hub 72, a wheel-like body which would give the laminated portion of the rotor a greater rigidity and which would spatially stabilize the flux field extending through the rotor.

In order to improve the ventilating action made possible by the radial teeth 70 and slots 71, the hubs 72 are provided with oblique channels 74 through which a gaseous cooling medium, which is constituted primarily by air, may flow. In addition, there is provided, between each rotor disc and one outer wall of the housing, a respective one of the heat exchangers 75 and 76. These cooling devices are preferably each constituted by a spirally-wound tube through which a cooling medium flows.

Figure 21:
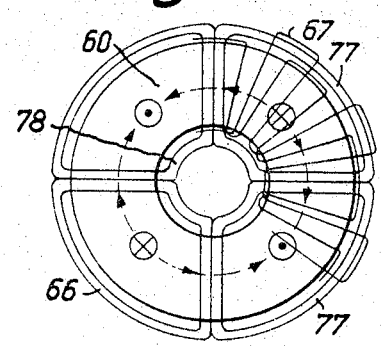
FIGURE 21 is a plan view of one of the members of the device of FIGURE 20.

FIGURE 21 is a plan view of the stator 60 showing preferred forms which the excitation winding and the A.C. winding may take. The stator 60 is constituted by a plurality of, in this case four, sectors each of which sectors is surrounded by one coil of the excitation winding 66, the coils being wound so that the axial direction of excitation flux flow reverses from one stator sector to the next. The radial conductors of the winding 66 are disposed in radial bores formed in stator 60 and these radial conductors are connected together by arcuate outer conductor segments 77 and inner conductor segments 78. In accordance with an alternate form of construction, the excitation winding can be split into the two portions each of which is disposed in a set of grooves formed in a respective end face surface of stator 60. It should be noted that the number of stator sectors enclosed by each coil of the excitation winding will not determine the frequency of the signal induced in the A.C. windings 67 and 68 since this frequency is determined entirely by the number of slots and teeth, and the rate of rotation, of the rotor discs 61 and 62.

The paths of the flux generated by the excitation winding 66 extend parallel to the machine axis when passing through the air gaps 64 and 65 and follow circular arcs concentric with the axis of shaft 23' when passing through the rotor discs. Each flux loop passes twice through the variable magnetic conductance zone defined by each air gap. It may thus be seen that each flux loop encloses a surface defining the wall of an imaginary cylinder which is arranged concentrically with the axis of shaft 23'. It may be noted that this configuration also appears in the other heteropolarly excited machines constructed according to the present invention.

As is also shown in FIGURES 20 and 21, each end face of stator 60 is also provided with a plurality of radially-extending grooves in which a respective one of the A.C.

windings 67 and 68 is received. Several radial conductors of each A.C. winding are thus enclosed by one coil of the excitation winding. As may best be seen in FIGURE 21, each A.C. winding, such as the winding 67 is constituted by two wave windings each of which is angularly offset with respect to the other. These two windings can be connected together either in series or in parallel, depending on whether it is desired to generate a relatively large voltage or a relatively large current.

As is also true for the other heteropolarly excited machines which have previously been described in detail herein, the number of A.C. winding grooves formed in each end face of the stator 60 is preferably made equal to the total number of teeth 70 and slots 71 provided in each rotor disc 61 or 62. In order to permit the generator to function according to the modulation principle, the stator is preferable constructed so as to have no regions, other than the winding grooves, which produce a variable magnetic conductance. These relationships may best be seen in FIGURE 22 which shows a developed axial view of a rotor disc 61 and a portion of a stator 79 which differs from the stator 60 of FIGURE 20 primarily in that the excitation windings, here represented by excitation coils 80, 81 and 82, are disposed in the surface rather than at the median plane of the stator. The stator 79 has an identical set of excitation coils disposed in its other end face (not shown). Stator 79 is also provided with grooves 83 for receiving the conductors of an A.C. winding. The grooves 83 are preferably partly closed in order to reduce stray flux losses.

The generator of FIGURE 20 could also be modified by providing a different number of slots and teeth on one rotor disc than on the other rotor disc and by providing each end face of the stator with a separate A.C. winding comprising as many radial conductors as there are slots and teeth combined in its associated rotor disc. This arrangement permits the two rotor discs to produce two separate A.C. voltages having two different frequencies. This result can be achieved in devices produced according to the present invention primarily because the pulsating flux appearing at each air gap becomes an unvarying flux in the region of the stator which extends between the two sets of A.C. winding grooves, with the result that the flux pulsations occurring in one air gap will have substantially no effect on those occurring in the other air gap. In addition, any tendency of the flux to fluctuate in the region between the two A.C. windings will be very effectively suppressed by the electrically conductive cooling pipes 69 disposed in the median plane of the stator.

In the construction of the device of FIGURE 20, care must be taken to assure that the cooling pipes 69 not be positioned too closely to the winding grooves. These cooling pipes also act as a damper cage which produces the advantageous auxiliary function of improving the shape of the A.C. output when the machine is designed to generate only one frequency. The shape of the output waves can also be improved by giving each of the rotor slots and teeth a curved shape rather than the linear shape illustrated in FIGURE 23. It should be noted, however, that such a curved shape will increase the costs of manufacturing the rotor discs.

The provision of cooling pipes in cooperation with the stator, as is shown in FIGURE 20, also contributes substantially to the efficiency of the utilization of the stator material because these pipes permit the heat produced in the machine to be transmitted from the critical points thereof to the cooling medium. Furthermore, the heat generated in the regions of the air gaps is dissipated directly from the A.C. windings, and from the slots and teeth, by the air flowing in the direction of the arrows in FIGURE 20. This air, which is driven by the movement of the rotor slots and teeth, passes through the heat exchangers 75 and 76 and re-enters the air gaps through the passages 74.

The flux produced by the excitation winding 66 is effectively utilized since each flux loop passes twice through each air gap in an axial direction. The flux in each loop is thus modulated four times in each case. In addition, substantially all of the flux serves to induce voltages in the A.C. windings disposed in each end face of stator 60, because the A.C. windings extend to a point which is very close to shaft 23'. It may thus be seen, that, in general, the form of construction proposed by the present invention permits the achievement of very high operating efficiencies.

As has already been mentioned, the forces with which the stator is attracted by both rotors due to the magnetic fields produced by the excitation winding is completely eliminated by the provision of two identical rotor discs and by the placement of the excitation winding at the median plane of the stator. At the same time, these attractive forces have the effect of pressing the rotor discs onto their conical seats against the collar of the central portion of shaft 23'. As a result, the rotor can be made of two separate discs which would be relatively simple to manufacture. In order to assure that the two rotor discs will be symmetrically disposed with respect to the median plane of the stator, it is only necessary to ensure that this collar on shaft 23' be properly positioned with respect to the stator.

It should also be noted that the construction of the machine illustrated in FIGURE 20 is substantially simplified by the disposition of all of the windings on the stationary member 60. However, it would also be possible, in accordance with the principles of the present invention, to mount the winding-carrying member 60 for rotation and to maintain the discs 61 and 62 stationary. In this case, however, the construction of the machine would be rendered more difficult because it would be necessary to provide slip rings and commuators or similar elements, for making connections to the various windings.

Figure 24:
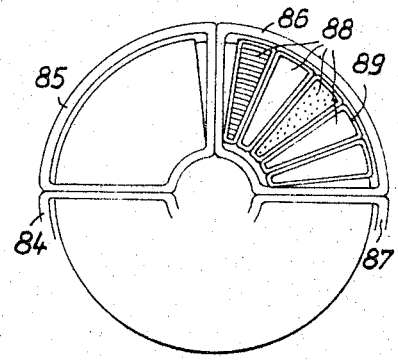
FIGURE 24 is a plan view of a modified version of the member shown in FIGURE 21.

In accordance with another embodiment of the present invention, the generator shown in FIGURE 20 may be provided with a stator of the type illustrated in FIGURE 24. As is shown therein, the stator is divided into a plurality of sectors similar to those shown in FIGURE 21, and each of these sectors is provided with a plurality of coil cores 88 which are also in the form of sectors, the total number of cores preferably being made equal to the total number of teeth provided on each rotor. Each of these cores is either made of a plurality of arculate laminations each layer of which is electrically isolated from its adjacent layers, or is made of a ferrite. Each individual core is surrounded along its entire axial dimension with turns of an alternating voltage winding 89. As may be seen, several of these cores together constitute a sector of the stator ad each stator sector is enclosed along its entire axial dimension with turns of the excitation winding 86 which is wound in such a manner that the excitation flux flows in a different axial direction in each succeeding stator sector.

A generator equipped with a stator of this type having ferrite cores will operate according to the modulation principle and will be of great value in certain cases, if, for example, it is desired to utilize the advantageous magnetic properties of ferrites. It should be noted, however, that ferrite cores are relatively expensive and that the construction of a stator having the form shown in FIGURE 24 is more costly than that of a stator having the form shown in FIGURE 21. In addition, a stator of the type shown in FIGURE 24 is more difficult to assemble and the relative alignment of the individual cores can be disturbed as they become heated during machine operation. Furthermore, the coils which extend across the entire axial dimension of the stator of FIGURE 24 tend to produce a greater amount of stray flux which may, under certain circumstances, create reactive currents whose presence requires the provision of additional compensating means. Since this stator is composed of a plurality of cores which are magnetically isolated from each other, the pulsating flux extends through the entire stator and does not have the opportunity to return to the non-pulsating state at any point therein. Therefore, the machine can only be constructed to produce a single frequency output. In addition, it would be difficult to provide a cooling winding in this stator.

Figure 25:
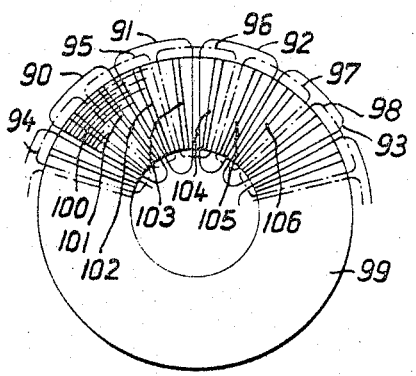
FIGURE 25 is a plan view of another modified version of the member shown in FIGURE 21.

Referring now to FIGURE 25, there is shown a plan view of another form of stator, which is constructed for operation according to the oscillating field principle. The stator 99 shown therein consists of a single laminated body and is provided with radial grooves in each end face. The coils of excitation windings 90 to 93 are disposed in suitable grooves and create a plurality of poles, with the direction of flux flow through each pole being opposite from that through the next-succeeding pole. A second set of sectors is constituted by the coils 94 to 98 of an A.C. voltage winding which is disposed in other grooves formed in stator 99. The sectors defined by the A.C. winding are angularly offset with respect to the sectors defined by the excitation winding in such a manner that one coil of the excitation winding encloses one coil side of each of two adjacent A.C. winding coils. For example, excitation winding coil 91 encloses one coil side of A.C. winding coil 95 and one coil side of A.C. winding coil 96. In addition, in each region defined by one coil side of the excitation winding and the immediately adjacent coil side of the A.C. winding, there is provided and empty radial groove such as one of the grooves 100 to 106. The provision of these grooves determines the frequency of the signal induced in the A.C. winding in the same manner as the grooves provided for the conductors of the A.C. winding in machines operating according to the oscillating field principle.

Figures 22, 26:
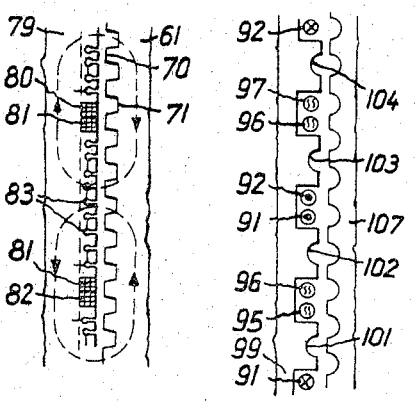
FIGURE 22 is an axial, developed view of a modified version of the device of FIGURE 20.
FIGURE 26 is an axial, developed view of a portion of a machine which is similar to the device shown in FIGURE 20 and which incorporates a member of the type shown in FIGURE 25.

Referring now to FIGURE 26, there is shown a developed view of the stator 99 of FIGURE 25 and a rotor 107 with which the stator is to cooperate, this rotor being similar to the rotor shown in FIGURE 23. It may be seen from FIGURE 26 that the grooves containing the conductors of the A.C. winding are fully open. Therefore, a greater amount of stray flux will be produced in such a device than in a device constructed in the form illustrated in FIGURE 22. In addition, machines operating according to the modulation principle, and particularly a machine of the type illustrated in FIGURES 20 to 22, will have lower losses than a machine constructed according to FIGURES 25 and 26 since the stator of a machine of the former type will be subjected to a smaller amount of pulsating magnetization and its rotor will have no oscillating field produced therein.

The embodiments which will now be described in connection with FIGURES 27 to 32 are all arranged to operate with homopolar excitation and in accordance with the modulation principle. Machines of this type have several inherent advantages, particularly in that their induced alternating currents are relatively free of harmonics. Such devices can also be advantageously constructed so that the rotor discs, which have no windings disposed thereupon, are only magnetized to a small depth by the stray flux from the rotor. As a result, each rotor disc can be made of a solid piece and the losses occurring therein during operation can be maintained at a low value.

Figure 27:
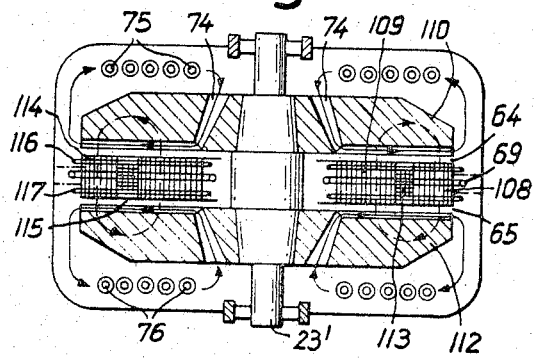
FIGURE 27 is an axial, cross-sectional view of a still further embodiment of the present invention.
Figure 28:
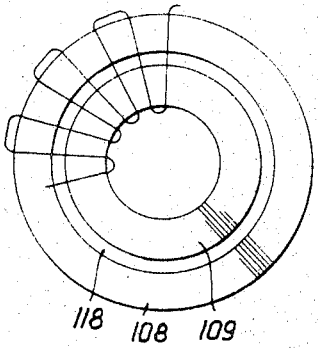
FIGURE 28 is a plan view of one member of the device of FIGURE 27.
Figure 30:
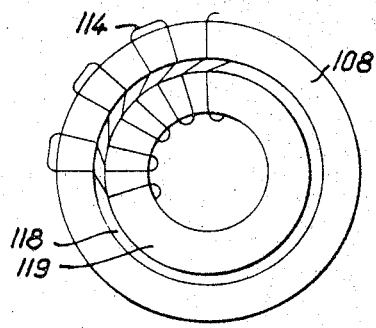
FIGURE 30 is a plan view of a modified version of the member of FIGURE 28.

The generator illustrated in FIGURE 27 differs from the heteropolarly-excited generator of FIGURE 20 primarily in the configuration of the stator and FIGURES 28 and 30 show two different ways in which an A.C. winding can be arranged on this stator. As is shown in these figures, the stator preferably consists of two concentric rings 108 and 109, each constituted by a ferrite material or by a spirally wound steel strip forming a laminated body each layer of which is electrically isolated from its adjacent layers, this latter form of construction being preferred primarily for reasons of economy. The laminated rings can also be constituted by a series of concentric, cylindrical bands. Disposed between the two rings 108 and 109 is a homopolar excitation winding 113 which serves to magnetically isolate the two rings from each other. The excitation winding 113 is covered by two rings 114 and 115 of nonmagnetic material which prevent the magnetic forces acting between the rings 108 and 109 from affecting excitation winding 113 and which help to stabilize the excitation field.

Figure 29:
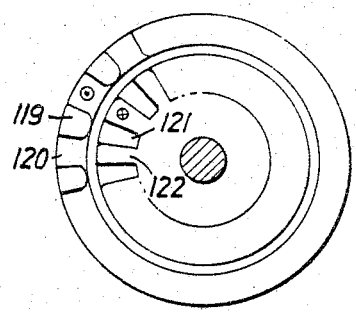
FIGURE 29 is a plan view of another member of the device of FIGURE 27.

The parts followed by the flux generated by the excitation winding 113 are indicated by dot-dash loops in FIGURE 27 and by conventional symbols in FIGURE 29. It may be seen from these figures that the two axially extending branches of each flux loop are disposed along the same machine radius. Each flux loop passes through each of the air gaps 64 and 65 in both axial directions so as to ensure an efficient utilization of the magnetic paths in the machine. The provision of a magnetic isolation between rings 108 and 109 and the relative dimensions of these rings assure that these rings will each receive the same amount of saturation.

The annular surfaces of the state are, as in the previous embodiments, provided with radially extending grooves for receiving respective A.C. windings 114 and 115. Whether these windings will be arranged in the form shown in FIGURE 28 or in the form shown in FIGURE 30 depends on the manner in which the radial slots and teeth are formed in the rotor discs 110 and 112.

Each rotor disc is constructed from a solid piece which is preferably constituted by a body of cast silicon steel, this material being particularly well suited for damping the pulsations of the excitation flux as it passes through the rotor discs. Radially extending teeth and slots are disposed in the surfaces of the rotor discs facing the air gaps to form regions of variable magnetic conductivity. As is shown in FIGURE 29, the rotor disc end face which is directed toward the air gap can be provided with a circular groove 118 in alignment with the excitation winding 113. The provision of this groove assures that the return paths of the excitation flux will pass behind the axial slots and teeth of the rotor in order to prevent the occurrence of rotor tooth saturation.

In order to prevent the voltage induced in the A.C. windings from creating losses in the rotor discs, the surfaces of the rotor teeth may be provided with axially laminated sheets or plates. However, it has been found to be considerably more advantageous to provide these laminations directly in the solid material constituting each rotor disc. This can be achieved by removing thin, axially extending portions from each rotor tooth.

Each of the rotor discs 110 and 112 is also provided with ventilating passages 74 disposed in its hub portion and is mounted on a shaft 23' which is preferably made of a nonmagnetic material. If the shaft were not made of such a material, its bearing surfaces could become damaged as a result of its interaction with the rotor discs under the influence of the strong excitation fluxes produced in the machine.

When a homopolar excitation is used, the rotor teeth and slots and the A.C. windings must be arranged in a particular way with respect to each other. Arrangements for producing this relation have been described in detail above in connection with embodiments of FIGURES 14 to 19. In accordance with the considerations there set forth, when the rotor disc is constructed with two bands 119–120 and 121–122 of teeth and slots, as is shown in FIGURE 29, each A.C. winding on the stator will be arranged as shown in FIGURE 28. On the other hand, if the rotor is constructed with one set of teeth 70 and slots 71, as is shown in FIGURE 23 each A.C. winding on the stator 108 will be arranged in the manner shown for winding 114 in FIGURE 30. The wave windings shown in FIGURES 28 and 30 could be replaced, if desired, by suitable lap windings.

Apart from the differences due to the utilization of homopolar excitation, a generator constructed in the manner shown in FIGURES 27 to 30 possesses all of the advantages of a device having the form of construction shown in FIGURES 20 to 23. These advantages include the quadruple modulation of each excitation flux loop by the two air gaps and the very effective ventilation which eliminates the need for a separate ventilator, even for high output levels.

Figure 31:
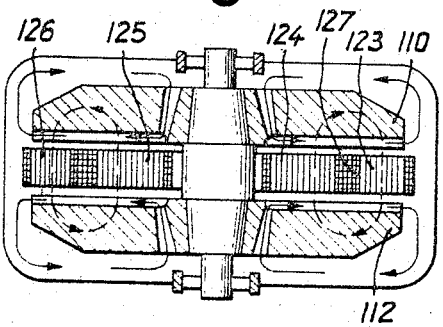
FIGURE 31 is an axial, cross-sectional view of yet another embodiment of the present invention.
Figure 32:
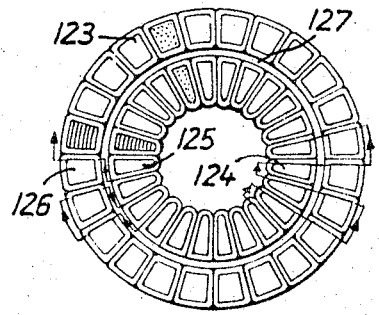
FIGURE 32 is a plan view of one member of the device of FIGURE 31.

FIGURE 31 shows a modification of the device of FIGURE 27 which differs therefrom primarily in the structure of the stator. A plan view of this stator is shown in FIGURE 32. This stator is formed of a plurality of sector-shaped coil cores divided into two bands with the cores of each band having identical cross sections. The cores of each band are separated from one another by radially extending separating grooves and the two bands are separated from one another by an annular, nonmagnetic separating groove in which the homopolar excitation winding 127 is disposed. The number of cores 123–126 is determined by the tooth pitch of the machine rotor disc. Each core is wound, along its entire axial dimension, with turns of the A.C. winding, which turns also function as nonmagnetic separating layers between the cores. The coils around the cores of the outer band are connected to the coils around the cores on the inner band in the manner suggested either in FIGURE 28 or in 30, depending on the form of construction of the teeth and slots of the rotor discs.

The particular properties of the stator disc constituted by a plurality of segment-shaped cores have been described above in connection with FIGURE 24.

According to another embodiment of the present invention, a machine having three disc members can be constructed to operate as a synchronous motor. One form of such a machine is shown in FIGURES 33 to 36 to include a stationary, laminated central disc 128 and two outer rotary discs 129 and 130. The central disc 128 is provided with an A.C. winding 166 which includes two sets of radial conductors, each of which sets is disposed in radial grooves 167 formed in a respective end face of disc 128. As is most clearly shown in FIGURE 34, winding 166 also is provided with end connection portions which extend across the outer circumference of disc 128 between the two end faces thereof. All of the end connection portions are arranged at the same angle with respect to the median plane through disc 128 so that the winding 166 makes efficient use of the available space. FIGURE 36 shows a winding diagram which can be used in conjunction with FIGURE 34 to provide a clear understanding of the precise manner in which winding 166 is arranged. Winding 166 constitutes a three-phase winding and various points thereon are designated with reference symbols U, V, W and X, Y, Z in accordance with standard practice for three-phase windings. FIGURE 36 also shows four sector-shaped claw poles 133 and 134 which are formed on each of the rotor discs 129 and 130. The directions of axial flux flow created by these claw poles are indicated by the symbols 137 and 138.

Figure 33:
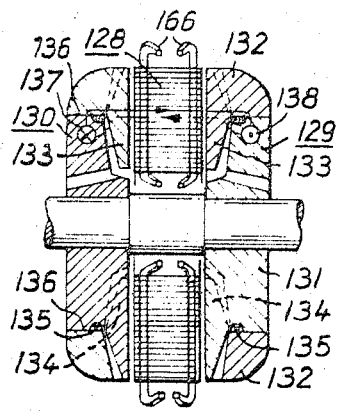
FIGURE 33 is an axial, cross-sectional view of still another embodiment of the present invention.
Figure 34:
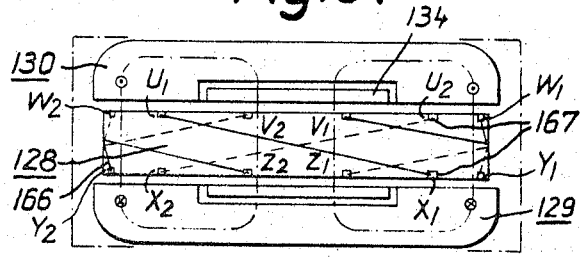
FIGURE 34 is an axial view of the device of FIGURE 33.

FIGURE 33 shows an axial, cross-sectional view of the device of FIGURE 34. Each of the rotor discs 129 and 130 is composed of a disc portion 131 and an annular portion 132 provided with claw poles 134 and 133, respectively. These claw poles are formed in a manner which is roughly analogous to that illustrated in FIGURE 12. Thus, each claw pole 134 alternates with a claw pole 133. Disposed between portions 131 and 132 of each rotor disc is an annular excitation coil 135. A magnetic return path 136 is arranged in axial alignment with the excitation winding 135 and to the outside thereof.

Figure 35:
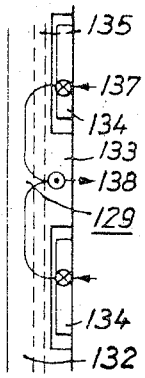
FIGURE 35 is an axial, developed view of a portion of the device of FIGURE 33.
Figure 36:
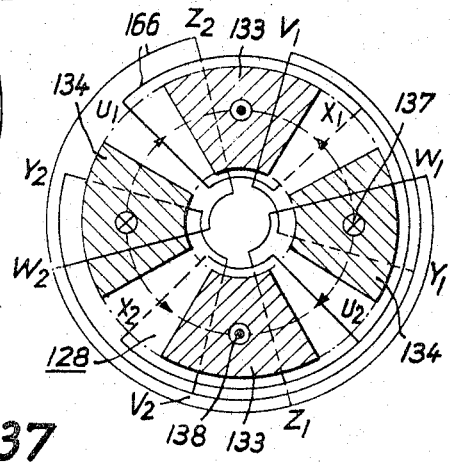
FIGURE 36 is a plan view of one member of the device of FIGURE 33.

FIGURE 35 is a developed view showing one rotating disc 129 constructed in the manner illustrated in FIGURES 33 and 34. This view shows the manner in which the claw poles 133 and 134 modify the configuration of the flux produced by winding 135 and shows the directions of travel 137 and 138 of the flux through the air gap to the right of the claw poles shown in FIGURE 35.

Figure 38:
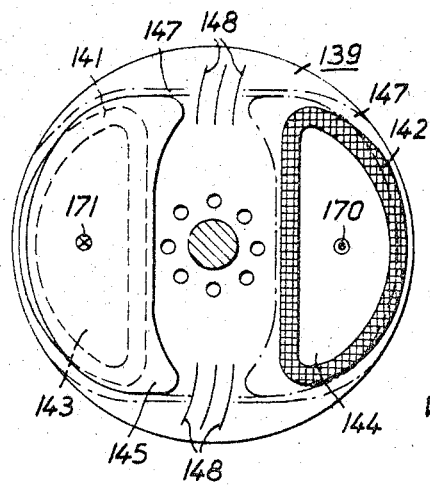
FIGURE 38 is a plan view of one member of the device of FIGURE 37.
Figure 37:
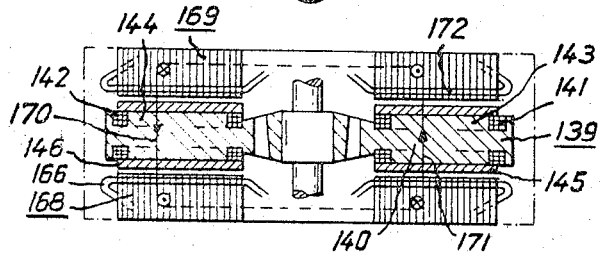
FIGURE 37 is an axial, cross-sectional view of a still further embodiment of the present invention.

Turning now to FIGURES 37 and 38, there is shown another form which a synchronous machine according to the present invention can take. This embodiment includes a rotating central disc member 139 and two stationary outer discs 168 and 169 which are each constituted by a laminated body. Each of these outer discs 168 and 169 can be constructed either by forming a spiral coil coated with a nonmagnetic layer or by assembling a series of cylindrical bands separated from each other by nonmagnetic layers. When this form of construction is used, a separate return path is constituted by each lamination of the discs 168 and 169 so that the flux flowing therethrough follows circular paths concentric with the axis of the machine shaft. The axial flux flow between discs 168 and 169 is indicated by arrows 170 and 171. Each outer disc 168 and 169 carries an A.C. winding 172 whose radial conductors are disposed in suitable grooves (not shown) formed in the end face of each outer disc which is directed toward the central rotor member 139. This rotor disc is shown in detail in FIGURE 38 and includes an annular member made of a solid piece and having grooves formed in its two end faces for receiving D-shaped excitation coils 141 and 142. These grooves also serve to define pole portions 143 and 144, it thus being unnecessary to separately manufacture and mount these pole portions. The pole portions and the excitation coils are covered by generally D-shaped pole shoes 145 and 146. The precise shape of these shoes is selected to cause the voltages induced in the A.C. windings disposed in the outer discs to be as nearly sinusoidal as possible. If desired, the pole shoes 145 and 146 can be provided with radial bores (not shown) for receiving damper rods in the case that a damper ring placed around these pole shoes would not be adequate. It is also possible to dispose damper rings 147 (FIGURE 38) about pole shoes 145 and 146 in order to maintain a symmetrical magnetic excitation field. In addition, ventilator blades 148 are provided on each stator disc for augmenting the ventilation action produced by the rotation of the motor. Power is supplied to the coils 141 and 142 either through the intermediary of slip rings or by means of transformer-fed rotating rectifiers, neither of which has been shown herein.

According to another feature of the present invention, the A.C. voltage induced in windings 172 can be given as sinusoidal a shape as possible by giving the pole shoes 145 and 146 the form of disc sectors and by additionally shaping these shoes so that their thickness varies progressively along a cylindrical plane concentric with the machine axes in such a way as to cause the axial length of the air gap to vary progressively in an angular direction. A properly selected shape makes it possible to obtain a very close approximation to a true sine wave.

Figure 39:
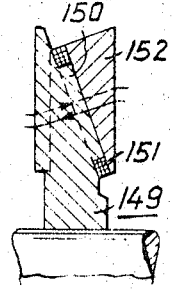
FIGURE 39 is an axial, cross-sectional detail view of a modified version of the member shown in FIGURE 38.

In accordance with another embodiment of the present invention, the central disc of the machine of FIGURE 37 can be constructed in the manner shown in FIGURE 39 in which there is shown a central disc 149 mounted on machine shaft and provided with obliquely oriented pole portions 150 about which excitation winding coils 151 are disposed. It has been found that the generation of excitation flux by means of such coils results in a considerably improved time constant as compared to the generation of excitation flux with the aid of an annular coil. Such an arrangement also produces structural simplifications since several small coils can be manufactured more easily, and their heat expansion can be more easily controlled, than is the case for a single annular coil.

Secured to the pole portions 150 are pole shoes 152 which are so shaped that their outer face is perpendicular to the axis of rotation of the machine shaft. Because the disc 149 tapers toward the machine circumference, this disc has the advantage of being subjected to a uniform centrifugal stress in the radial direction. If the pole shoes 152 are secured by means of bolts or screws, the shearing stresses to which these attachment devices would be subjected may be prevented by resorting to a different centering technique, which has not been shown in detail herein. These pole shoes 152 have a thickness which increases toward the periphery of the rotor in order to create an air gap whose length is constant in a radial direction. However, it is also possible to shape these pole shoes so that the length of the air gap varies in such a manner that the A.C. voltage produced has as nearly a sinusoidal shape as possible.

Figure 40:
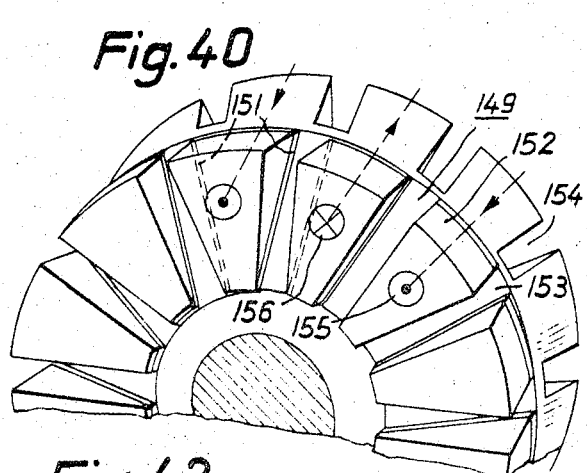
FIGURE 40 is a perspective view of the member shown in FIGURE 39.

FIGURE 40 is a perspective view of the arrangement shown in FIGURE 39. As shown in FIGURE 40, the other end face of the rotor disc is provided with radial grooves 154 which are disposed in alignment with the grooves 153 separating the pole shoes 152 from each other. These grooves 154 serve to produce a more clearly defined heteropolar excitation field. The individual coils 151 are interconnected in such a way as to give each pole shoe a polarity which is opposite to that of its adjacent pole shoes, as is indicated by the symbols 155 and 156.

Figure 41:
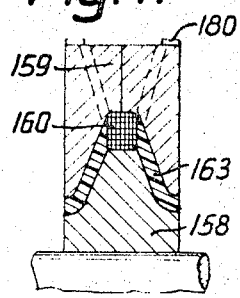
FIGURE 41 is an axial, cross-sectional detail view of a modified version of the member shown in FIGURE 39.
Figure 43:
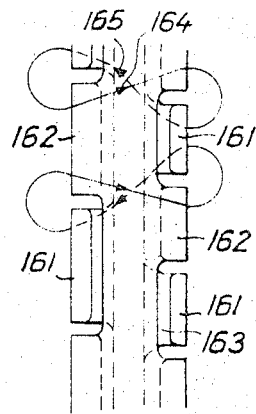
FIGURE 43 is an axial, developed view of the member shown in FIGURE 41.

Turning now to FIGURES 41 and 43, there is shown another embodiment of the present invention which has the form of a single-armature converter whose rotary central disc 157, which is illustrated in FIGURE 41, has the form of the two outer discs 129 and 130 of FIGURE 33, placed back-to-back. The central disc 157 is composed of a disc-shaped portion 158 and an annular portion 159. Between these two portions an annular excitation coil 160 is positioned, this coil also serving to magnetically separate the portion 158 from the portion 159. Disc 157 includes two sets of claw poles, each of which sets is formed in a respective flat face of the member 157. Thus, as is best shown in the developed view of FIGURE 43, claw poles 161 extend from each end face of one of the portions of disc 157 and claw poles 162 extend from each end face of the other portion of disc member 157, with each claw pole 161 being interposed between adjacent claw poles 162. The spaces between adjacent claw poles are preferably filled with a nonmagnetic material, such as a casting resin. Member 157 can also be provided with damper rings 180 and with radial damper rods, in the manner described in connection with preceding embodiments of the present invention.

Figure 42:
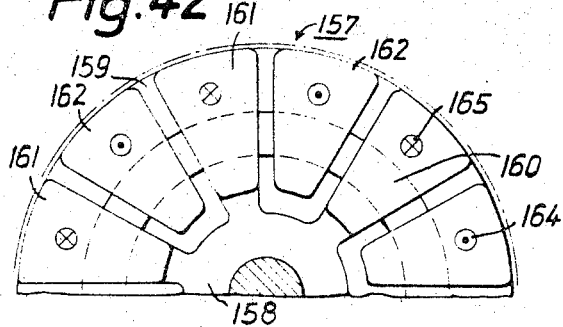
FIGURE 42 is a partial plan view of the member shown in FIGURE 41.

FIGURE 42 shows a plan view of the central disc member 157. Each of the two end faces of this disc, one of which faces is intended to produce a motor operation and the other of which faces is intended to produce a generator operation, has a different pole pitch, as is shown most clearly in FIGURE 43. The arrows 164 and 165 show the paths followed by the magnetic flux in this disc member. The pitch of the A.C. winding disposed in each outer disc (not shown) is made to correspond to the pitch of the poles disposed in the corresponding end face of member 157.

It has already been mentioned above that laminated members of the various embodiments of the present invention can be fabricated by coiling a sheet metal band or strip. According to another feature of the present invention, it is also possible to produce a member having similar magnetic properties by forming axially-extending arcuate slots in the face of a solid mass of material, as was mentioned above in connection with FIGURE 27. These slots may be formed by the known spark erosion process, which process is particularly well suited for producing such a result since this process can be so controlled as to produce slots having a relatively small width and a sufficient depth. The resulting slots can then be filled with a cast resin, for example, in order to give the member a smooth surface.

The specific embodiments of the present invention which have been described herein have been limited to electric machines and converters, and each embodiment has been described as having certain rotary parts and certain stationary parts. This manner of description was adopted in order to facilitate an understanding of the basic principles of the present invention. It should be noted, however, that it is immaterial, in applying the teachings of the present invention, which parts rotate and which parts are stationary, if mundane housing and bearing problems are disregarded. It would also be possible, without departing from the present invention, to have both parts rotate, as is also true of prior art rotating machines. For example, both machine parts rotate in electromagnetic slip clutches, which operate according to the same principle as an electric machine. It is also possible to apply the teachings of the present invention to the construction of eddy current brakes. It should therefore be understood that the present invention is also intended to cover these types of electric machines.

In bringing the teaching of the present invention to bear upon eddy brakes, an embodiment is constituted of a central member such as embodied in FIGURES 39 and 40, and of two fixed annular members of high magnetic conductivity mounted parallel to the faces of the rotor, aligned with it, and separated from it by air gaps on either side of it. By inducing eddy currents in the annular members, the rotor is braked, as is known in the art.

A slip clutch according to the present invention differs from an eddy brake insofar as the annular members will be laminated in the way described above in the case of a generator, and that a squirrel cage similar to that indicated for asynchronous devices may be provided.

It will be understood that the above description of the present invention is susceptible to various modifications, changes, and adaptations, and the same are intended to be comprehended within the meaning and range of equivalents of the appended claims.

What is claimed is:

1. In a rotary electrical machine composed of at least one stator disc and at least one rotor disc, there being a total of three discs, the discs being structurally separate from one another and being spaced axially from each other to define two axially-extending air gaps each disposed between two adajacent discs, at least one of the air gaps having a varying reluctance around the circumference of the machine, one of the discs adjacent the one air gap being provided with a plurality of radial grooves in the surface thereof which faces the one air gap, the radial conductors of an A.C. winding being disposed in such grooves, the machine further including an annular D.C. excitation winding carried by one of the discs adjacent the one air gap, the improvement wherein:
  one of said discs adjacent said one air gap is composed, at least on the side facing said one air gap, of an inner disc portion and a concentric outer ring portion;
  said D.C. excitation winding is axially aligned with the boundary between said portions for producing magnetic flux which traverses said inner portion in one axial direction and said outer portion in the opposite axial direction; and
  each of the radial conductors of said A.C. winding traverses the entire radial dimension of said one air gap.

2. An arrangement as defined in claim 1 wherein said machine operates as an electromagnetic slip clutch.

3. An arrangement as defined in claim 1 wherein said machine operates as an eddy current brake.

4. An arrangement as defined in claim 1 wherein, for causing said one air gap to have a varying reluctance around the circumference of the machine, one of said discs adjacent said one air gap is provided, on the surface thereof facing said one air gap, with a plurality of radially extending, angularly spaced teeth, the spaces between said teeth defining slots.

5. An arrangement as defined in claim 4 wherein said teeth and slots extend across the entire radial dimension of said one air gap, and wherein each radial conductor of said A.C. winding has a first portion which is disposed radially inwardly from the circuit defined by said excitation winding and a second portion which is disposed radially outwardly thereof, said first portion being disposed in one of said radial grooves and said second portion being angularly offset from said first portion and being disposed in the next adjacent one of said radial grooves.

6. An arrangement as defined in claim 4 wherein each of said radial conductors extends in a straight line across the entire radial dimension of said one air gap, and said teeth and slots are provided on said one disc, there being two sets of teeth and slots, one set being formed in said disc portion and the other set being formed in said ring portion, the teeth and slots in said ring portion being angularly offset with respect to the teeth and slots in said disc portion in such a manner that each slot on said ring portion is in radially alignment with a tooth on said disc portion.

7. An arrangement as defined in claim 1 wherein said portions are dimensioned relative to one another for causing the flux flowing therethrough to have the same density in both portions and hence to subject both portions to the same degree of magnetic saturation.

8. An arrangement as defined in claim 1 wherein each of said discs is composed of an inner disc portion and a concentric outer ring portion, with the flux produced by said excitation winding traversing the inner disc portion of each said disc in one axial direction and the outer ring portion of each said disc in the opposite axial direction, and wherein each disc defining an end of said machine is provided with a solid portion at its axially outer surface which provides a magnetic return path, each disc defining an end of said machine constituting an end disc and the disc between said end discs constituting an intermediate disc.

9. An arrangement as defined in claim 8 wherein each said end disc is provided, at the surface thereof facing its associated air gap, with a plurality of radial winding grooves, and there are two A.C. windings each having its radial conductors disposed in the radial grooves formed in one said end disc to have a predetermined winding configuration.

10. An arrangement as defined in claim 9 wherein each of said end discs is provided with a laminated portion at the side thereof which faces its associated air gap, which laminated portion is composed of a plurality of arcuate, axially extending laminations which are magnetically separated from each other.

11. An arrangement as defined in claim 9 wherein said intermediate disc is further provided with a ring of nonmagnetic material disposed between its said inner disc portion and its said outer ring portion and extending across the entire axial dimension of said intermediate disc.

12. An arrangement as defined in claim 9 wherein said intermediate disc is provided at each end face thereof with a plurality of radially extending, angularly spaced teeth, the spaces between adjacent teeth defining slots, with the number of teeth on one surface of said intermediate disc being different from that on the other surface thereof.

13. An arrangement as defined in claim 9 wherein said excitation winding is carried by said intermediate disc in a groove formed in the periphery of its said inner disc portion.

14. An arrangement as defined in claim 9 wherein there are two annular excitation windings each carried by a respective one of said end discs and disposed in axial alignment with one another.

15. An arrangement as defined in claim 14 wherein said excitation windings are connected together in series.

16. An arrangement as defined in claim 8 wherein said excitation winding is carried by said intermediate disc at the boundary between its said inner and outer portions, said intermediate disc also carrying said A.C. winding in radial grooves formed in that surface thereof which faces said one air gap, said intermediate disc further including a nonmagnetic separation ring disposed between its said inner and outer portions and extending across its entire axial dimension, and each of said end discs is provided with a plurality of radially extending, angularly spaced teeth, on the surface thereof which faces its respective air gap, the spaces between adjacent teeth defining slots.

17. An arrangement as defined in claim 16 wherein each said portion of said intermediate disc is divided by radially extending separation grooves into a plurality of sector-shaped coil cores all having substantially the same cross-sectional area and the total number of cores on each said portion being equal to the total number of teeth and slots in each said end disc, one turn of said A.C. winding being wound around each said coil core.

18. An arrangement as defined in claim 16 wherein said separation ring is constituted by the insulation on said excitation winding.

19. An arrangement as defined in claim 16 wherein each of said end discs is constituted by a solid body having an annular nonmagnetic groove formed in that surface which faces its associated air gap, which groove is in axial alignment with said excitation winding.

20. An arrangement as defined in claim 19 wherein each said groove is formed by the removal of material from said end disc by spark erosion.

21. An arrangement as defined in claim 20 wherein the portion of each said end disc which is removed by spark erosion is filled in with a casting resin.

22. An arrangement as defined in claim 16 wherein each said end disc is provided, at the surface thereof which faces its associated air gap, with a laminated portion, composed of a plurality of arcuate, axially extending laminations which are magnetically separated from each other.

23. An arrangement as defined in claim 22 wherein said laminations are formed by the removal of axially extending portions of each said end disc by spark erosion.

24. An arrangement as defined in claim 23 wherein the portions of each said end disc which are removed by spark erosion are filled in with a casting resin.

25. An arrangement as defined in claim 16 wherein said intermediate disc is laminated throughout its entire axial extent by a plurality of arcuate, axially extending laminations which are magnetically isolated from one another.

26. An arrangement as defined in claim 1 wherein there are two end discs and one intermediate disc disposed between said end discs, each of said end discs being provided with a plurality of passages positioned near the machine shaft for the flow of a gaseous cooling medium into the associated air gap and in a radial direction along such air gap, said machine further comprising a housing in which all of said discs are disposed and arranged for causing the cooling medium to circulate in a closed path on either side of said intermediate disc, and two heat exchangers, each disposed between one said end disc and said housing, said heat exchangers being in the path of flow of the cooling medium for cooling such medium.

27. An arrangement as defined in claim 1 wherein said one of said discs is disposed between the other two discs, said portions being formed at the side of said intermediate disc facing away from said one air gap, with two diametrically opposed, outwardly extending claw poles connected to said inner disc portion and two diametrically opposed, inwardly extending claw poles connected to said outer ring portion and arranged at right angles to said claw poles of said inner disc portion, said excitation winding being disposed between said two disc portions and said claw poles being arranged for converting the homopolar excitation flux produced by said excitation winding into a heteropolarly distributed excitation flux in the other said air gap, while said excitation winding produces a homopolar excitation for the electric system constituted by the discs associated with said one air gap.

28. An arrangement as defined in claim 27 wherein said end disc associated with said other air gap carries said A.C. winding and is provided with axially extending laminations at that surface thereof which faces its associated air gap.

29. An arrangement as defined in claim 28 wherein one said end disc is provided, at the side thereof which faces away from its associated air gap, with a spiral recess, said arrangement further comprising a cover plate which seals said recess and means for producing a flow of cooling fluid along said recess.

30. An arrangement as defined in claim 28 wherein said end disc associated with said one air gap is provided, at the surface thereof which faces away from its associated air gap, with an annular groove which is open in an axial direction away from said machine, said arrangement further comprising an iron ring having a cross section which corresponds to the cross section of said groove, said ring being axially movable for varying the magnetic flux level in its associated disc.

31. An arrangement as defined in claim 28 wherein said end disc associated with said one air gap carries said A.C. winding and is provided with a laminated portion composed of a plurality of axially extending laminations at that surface thereof which faces said one air gap, said arrangement further comprising an axially movable iron reinforcement ring disposed adjacent said one disc to divert a portion of the magnetic flux produced by said excitation winding and thus to constitute a magnetic shunt.

32. An arrangement as defined in claim 1 wherein there are two stator discs and one rotor disc disposed between said stator discs, said arrangement further comprising a rotatable shaft for said machine on which said rotor disc is mounted, said shaft being axially displaceable for varying the length of the air gaps between said rotor disc and said two stator discs.

References Cited
UNITED STATES PATENTS

| | | | |
|---|---|---|---|
| 3,304,450 | 2/1967 | Bosco | 310—126 |
| 3,329,843 | 7/1967 | Anderson | 310—168 |

MILTON O. HIRSHFIELD, *Primary Examiner.*

D. F. DUGGAN, *Assistant Examiner.*

U.S. Cl. X.R.

310—268